United States Patent
Eikhoff et al.

(10) Patent No.: US 6,200,411 B1
(45) Date of Patent: *Mar. 13, 2001

(54) METHOD OF ATTACHING A DECORATIVE FACING TO AN AUTOMOTIVE WHEEL

(75) Inventors: Mark T. Eikhoff, Shelby Township; Theodore A. Hanczaruk, Warren, both of MI (US)

(73) Assignee: Tech Trim, Inc., Fraser, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/704,450

(22) Filed: Aug. 27, 1996

(51) Int. Cl.⁷ .................................. B60B 7/06; B60B 7/00
(52) U.S. Cl. ......................................... 156/329; 301/37.43
(58) Field of Search .................................. 156/290, 291, 156/295, 329; 301/37.43

(56) References Cited

U.S. PATENT DOCUMENTS

| | | |
|---|---|---|
| 1,985,378 | 12/1934 | Lyon . |
| 2,226,511 | 12/1940 | Hollerith . |
| 2,522,024 | 9/1950 | Englehart . |
| 2,714,039 | 7/1955 | Pouell . |
| 2,926,953 | 3/1960 | Lyon . |
| 2,926,954 | 3/1960 | Lyon . |
| 3,517,968 | 6/1970 | Tully et al. . |
| 3,669,501 | 6/1972 | Derleth . |
| 3,726,566 | 4/1973 | Beith ....................................... 301/37.1 |
| 3,762,677 | 10/1973 | Adams . |
| 3,823,982 | 7/1974 | Spisak . |
| 3,891,276 | 6/1975 | Spisak . |
| 3,894,775 | 7/1975 | Christoph et al. . |
| 3,915,502 | 10/1975 | Connell . |
| 3,918,762 | 11/1975 | Hampshire . |
| 3,968,996 | 7/1976 | Wilcox . |
| 4,054,323 | 10/1977 | Lewis . |
| 4,251,476 | 2/1981 | Smith . |
| 4,270,805 | 6/1981 | Spisak . |
| 4,344,654 | 8/1982 | Apezynski . |
| 4,511,183 | 4/1985 | Spiegel et al. . |
| 4,514,529 | * 4/1985 | Beers ..................................... 524/731 |
| 4,530,542 | 7/1985 | Spiegel et al. . |
| 4,563,042 | 1/1986 | Seitz et al. . |
| 4,572,584 | 2/1986 | Brown . |
| 4,659,148 | 4/1987 | Grill . |
| 4,673,750 | * 6/1987 | Beers ..................................... 524/267 |
| 4,682,820 | 7/1987 | Stalter . |
| 4,861,538 | 8/1989 | Stalter, Sr. . |
| 4,874,206 | 10/1989 | Sampson . |
| 4,900,097 | 2/1990 | Kostov et al. . |
| 4,976,497 | 12/1990 | Post et al. . |
| 4,985,303 | 1/1991 | Addeo et al. . |

(List continued on next page.)

FOREIGN PATENT DOCUMENTS

| | | |
|---|---|---|
| 24 57 907 | 9/1978 | (DE) . |
| 28 13 412 | 10/1979 | (DE) . |
| 28 48 790 | 5/1980 | (DE) . |
| 29 52 000 | 7/1981 | (DE) . |
| 1 355 663 | 2/1964 | (FR) . |
| 2 281 698 | 6/1975 | (FR) . |

OTHER PUBLICATIONS

Technical Data Sheet Product 5900, Worldwide Version, Oct. 1995.

*Primary Examiner*—Jeff H. Aftergut
(74) *Attorney, Agent, or Firm*—Harness, Dickey & Pierce, P.L.C.

(57) ABSTRACT

A method is provided for applying a decorative exterior facing to a standard vehicle rim. The method allows an exterior facing to be applied to a standard rim using a bonding material and without modifying the rim and without a mechanical fastener.

8 Claims, 4 Drawing Sheets

U.S. PATENT DOCUMENTS

| | | |
|---|---|---|
| 5,031,966 | 7/1991 | Oakey . |
| 5,046,784 | 9/1991 | Carter, III .......................... 301/37.37 |
| 5,057,252 | 10/1991 | Kagawa et al. . |
| 5,059,106 | 10/1991 | Joseph . |
| 5,098,272 | 3/1992 | Joseph et al. . |
| 5,128,085 | 7/1992 | Post et al. . |
| 5,131,727 | 7/1992 | Johnson . |
| 5,143,426 | 9/1992 | Todd . |
| 5,188,428 * | 2/1993 | Carter ................................ 301/37.31 |
| 5,346,288 | 9/1994 | Hodge et al. . |
| 5,368,370 | 11/1994 | Beam ................................ 301/37.43 |
| 5,435,631 | 7/1995 | Maloney et al. . |
| 5,461,779 | 10/1995 | Beam ................................ 29/894.381 |
| 5,564,791 | 10/1996 | Chase et al. ...................... 301/37.43 |
| 5,577,809 | 11/1996 | Chase ................................ 301/37.43 |
| 5,595,423 * | 1/1997 | Heck ................................ 301/37.43 |
| 5,597,213 | 1/1997 | Chase ................................ 301/37.43 |
| 5,630,654 | 5/1997 | Chase ................................ 301/37.43 |
| 5,636,906 | 6/1997 | Chase ................................ 301/37.43 |

* cited by examiner

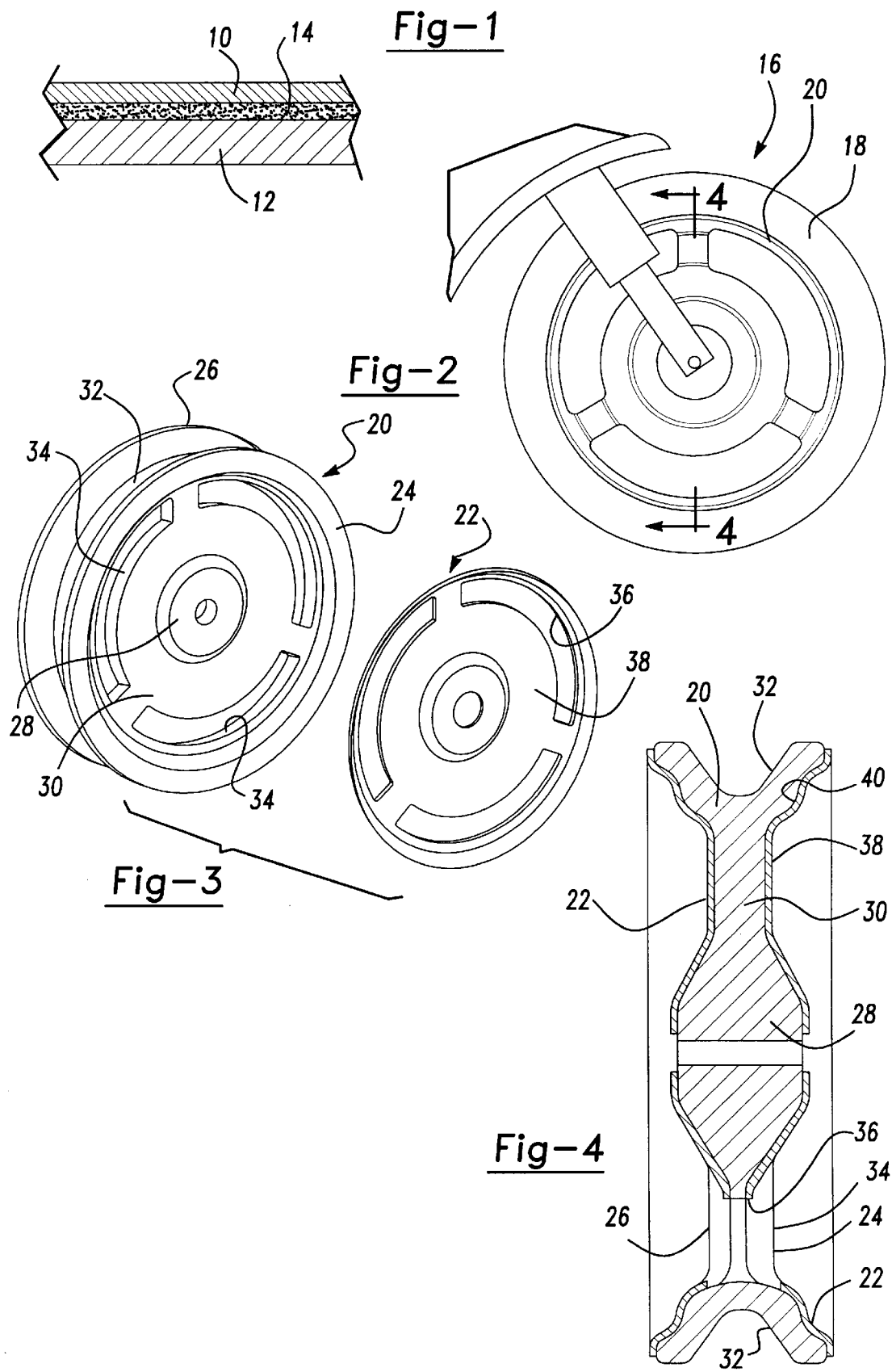

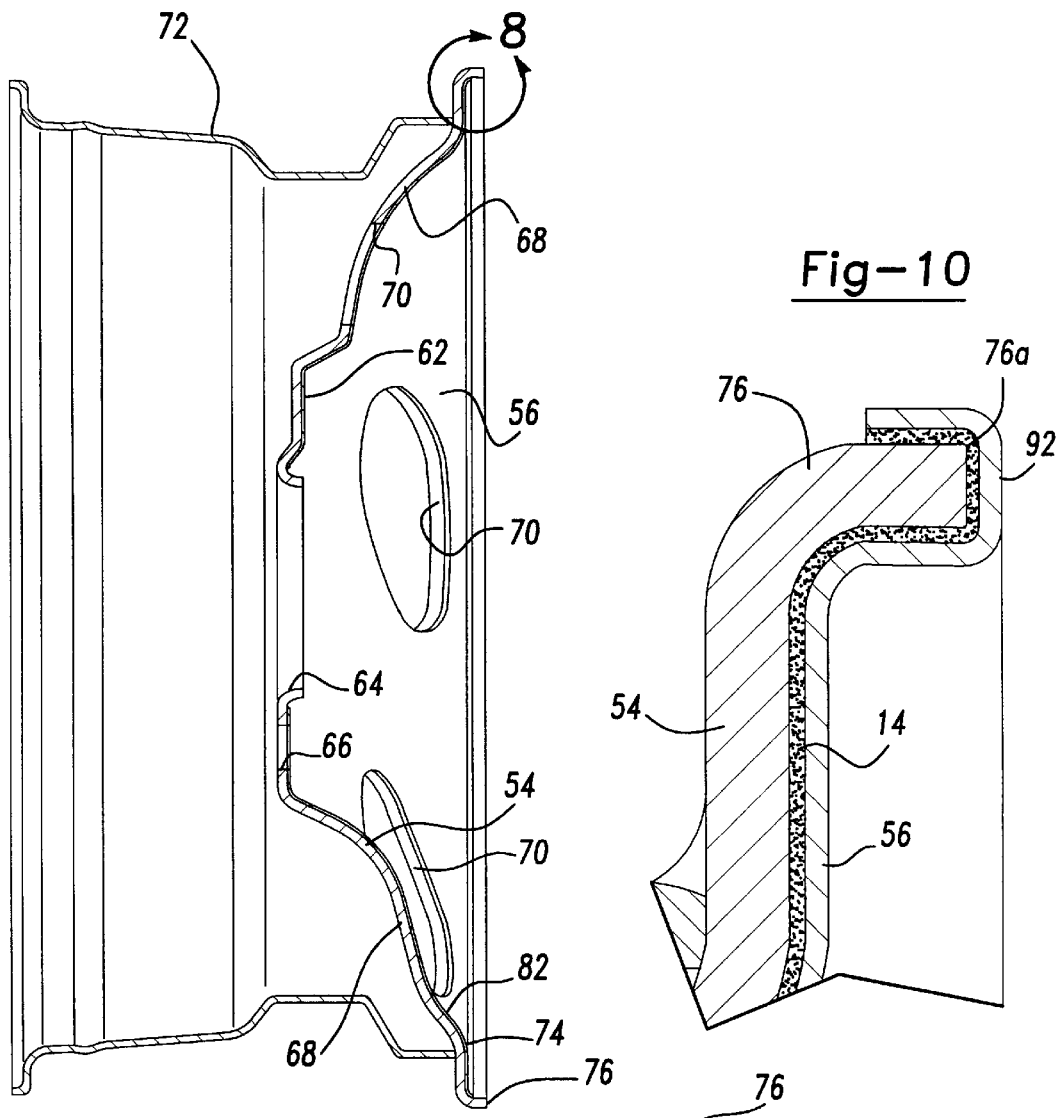
*Fig-10*
*Fig-8*
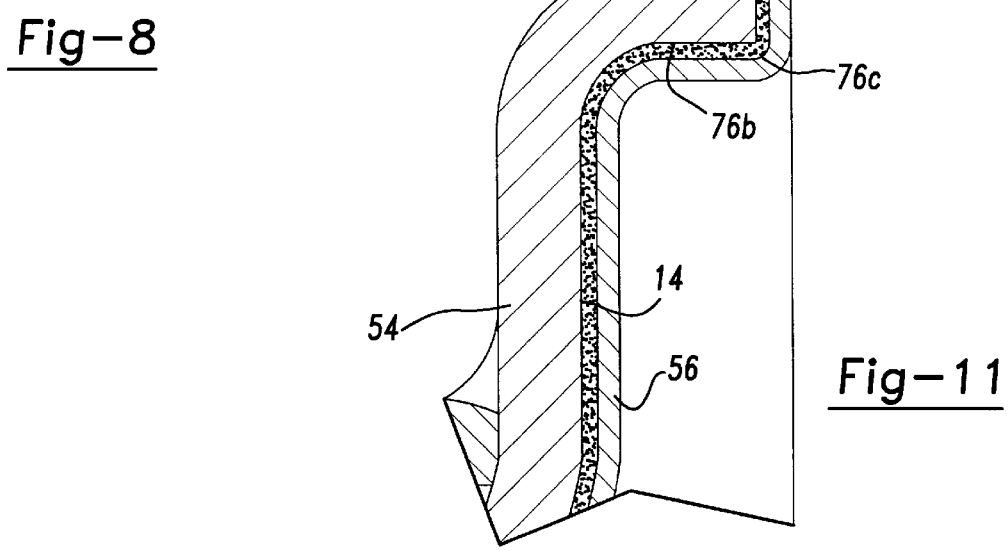
*Fig-11*

METHOD OF ATTACHING A DECORATIVE FACING TO AN AUTOMOTIVE WHEEL

FIELD OF THE INVENTION

The present invention relates to a method for applying an exterior facing to a vehicle wheel for enhancing the properties of the wheel.

BACKGROUND AND SUMMARY OF THE INVENTION

Chrome plated rims for automotive vehicles have been popular for many years. Chrome plated rims are available as an option on many models of automobiles. The chrome plated rim option is generally available at an additional cost to the standard price for a vehicle. The additional cost for chrome plated rims generally increases the price of a vehicle by several hundred dollars.

As an aftermarket option, a vehicle owner can have his standard wheel rims chrome plated at a cost of approximately $450.00 per rim. Therefore, the option of chrome plating an existing set of standard rims is generally cost prohibitive. Furthermore, many automotive vehicle models do not provide an option for chrome rims. Thus, there is a relatively large demand in the automotive industry for aftermarket methods for retrofitting a standard wheel rim with a chrome plated exterior facing at a reduced cost to the consumer.

Accordingly, a method has been developed for enhancing a standard vehicle wheel rim by providing an exterior facing, particularly one with a decorative bright face. In one embodiment, the method of the present invention allows an exterior facing to be applied to a standard wheel rim without modifying the standard wheel rim and without any mechanical fastener.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a cross-sectional view of an exterior facing applied to a base surface according to the principles of the present invention;

FIG. 2 is a side view of a motorcycle wheel including a rim and tire mounted to the front forks of a motorcycle;

FIG. 3 is a perspective view illustrating the assembly of the present invention before the exterior facing is applied to the face of the wheel rim;

FIG. 4 is a cross-sectional view taken along line 4—4 of FIG. 2;

FIG. 8 is a cross-sectional view of a rim having an exterior facing applied thereto according to the principles of the present invention;

FIG. 10 is a cross-sectional view of a second embodiment of the present invention;

FIG. 11 is a cross-sectional view illustrating a third embodiment of the present invention.

DETAILED DESCRIPTION OF THE PREFERRED EMBODIMENTS

Figure 5:
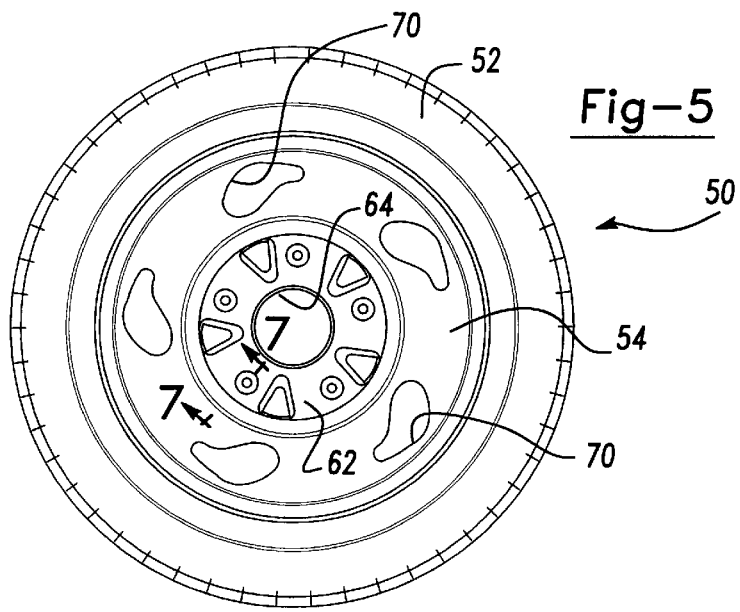
FIG. 5 is a side view of a vehicle wheel having a tire and rim, the rim is provided with an exterior facing according to the principles of the present invention.
Figure 6:
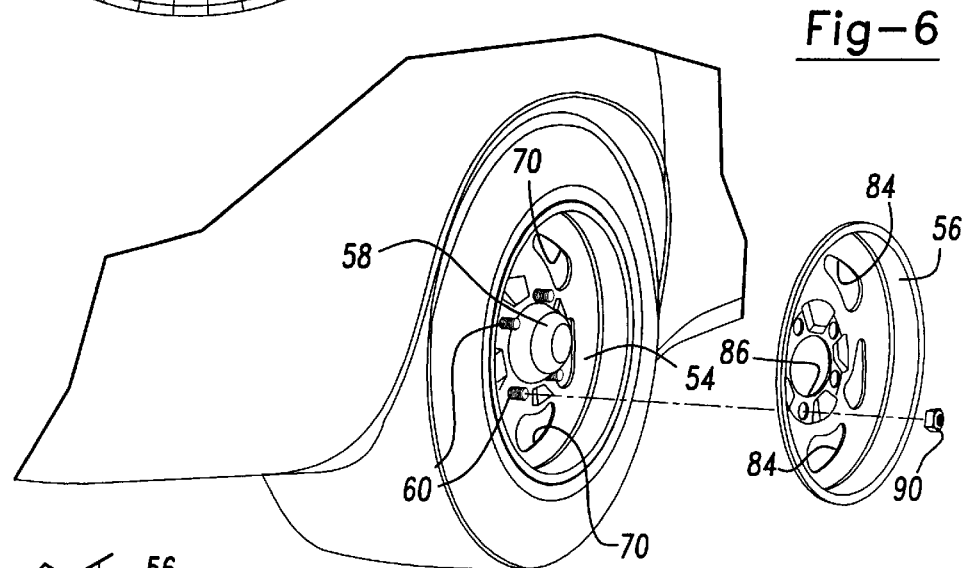
FIG. 6 is a perspective view of a vehicle wheel assembly having a tire, a rim, and an exterior facing, the exterior facing is shown prior to being applied to the rim.

With reference to FIG. 1, the application of an exterior facing material to a base material according to the present invention will be described. In FIG. 1, an exterior facing material 10 is applied to a base material 12 using a bonding material 14, which is preferably based on a silicone-containing material, and more preferably an oxime silicone rubber-containing material. The bonding material 14 preferably has good flexibility characteristics, gap filling ability, shock and heat resistance, the ability to avoid embrittlement or other adverse effects of thermal cycling, and the ability to bond without fixturing or otherwise mechanically retaining the materials that are bonded in place to allow the bonding material 14 to set up. In a preferred embodiment, when the exterior facing 10 is applied to a wheel rim, as will be described herein below, the above-described features of the bonding material allow the exterior facing to be applied to a standard wheel rim and will meet the desired performance characteristics. Thus, for use in a wheel application, the bonding material will withstand the loads encountered by a wheel and wheel facing under normal service conditions and still exhibit a high integrity bond.

The preferred bonding material for use with the present invention is LOCTITE product 5900, available from LOCTITE Corporation, Rocky Hill, Connecticut 06067-3910 (see Technical Data Sheet, hereby expressly incorporated by reference). LOCTITE product 5900 is a room temperature vulcanizing silicone bonding material/sealant, from a class of materials known as oxime silicone rubber materials.

The bonding material preferably has a flexibility of approximately 550% elongation prior to breaking. The surface of the bonding material preferably becomes dry to touch on exposure to atmospheric moisture within about five minutes, and preferably has heat resistance and avoids degradation due to heat up to approximately 450° F. Also, preferably the bonding material has gap filling ability which allows the bonding material to spread in situ upon application to fill gaps between the exterior facing 10 and base material 12, such as those that are the result of manufacturing variances.

The LOCTITE product 5900 bonding material is believed to have a specific gravity (at 20° C.) of about 1.3; to be a thixotropic paste (at 25° C.); to exhibit an extrusion rate (gm/min 3 mm nozzle, 6 bar, 25° C.) ranging from about 20 to about 80, and preferably about 35; and a flash point (TCC) of greater than about 93° C. In its cured state, preferably the material has a hardness, (shore A, measured according to ASTM D2240) ranging from about 25 to about 35. Other properties are apparent from the LOCTITE Product 5900

Technical Data Sheet (Preliminary World Wide version October 1995).

In one embodiment, the exterior facing conforms substantially over its entire structure with the surface contour of the base material to which it is applied and the exterior facing has a generally uniform cross section thickness throughout. In preferred embodiments, when the exterior facing is applied to a wheel, preferably the exterior facing has a relatively thin gauge (e.g. about 0.4 to about 0.7 mm, preferably about 0.5 mm) and is preferably made from a stainless steel (preferably an austenitic stainless, e.g. without limitation AISI type 301, 304, stainless steel or the like), nickel-chrome plated using conventional techniques with a layer of nickel-chrome plated to a minimum thickness of about 0.013 nickel and 0.0001 mm chrome. In another embodiment, where the facing is applied to a wheel rim, the exterior facing may contain protuberances or other surface variations relative to the underlying base material. In this regard, logos or emblems may be applied or embossed in the exterior facing. The exterior facing may also be made of aluminum or a plastic material. The exterior facing may also be coated using a Low Temperature Arc Vapor Deposition (LTAVD) process, services for which are available from Vapor Technologies, Inc. in Boulder, Colorado. LTAVD is a physical deposition (PVD) process which utilizes a high current, low voltage electric arc to evaporate essentially any electrically conductive material. The deposition process is a cathodic arc deposition process. Furthermore, the surface of an aluminum exterior facing could be turned or polished and coated using various techniques. The aluminum exterior facing may also be anodized to obtain a desired appearance.

FIGS. 2–4 illustrate an exterior facing material applied to a motorcycle rim while FIGS. 5–11 illustrate a exterior facing applied to a passenger vehicle wheel rim. With references to FIGS. 2–4, the motorcycle wheel 16 is provided with a tire 18 and rim 20. A chrome plated exterior facing 22 is applied to opposing faces 24, 26 of rim 20. Rim 20 is provided with a central hub portion 28, a spoke portion 30 extending radially from hub 28, and a wheel well portion 32 extending from spoke portion 30. Spoke portion 30 can be provided with openings 34 or can be provided with a solid configuration. It should be noted that the rim 20 is generally of a standard rim configuration as sold by motorcycle manufacturers.

Exterior facing 22 is formed to have a configuration generally conforming with a shape of each opposing face 24, 26 of rim 20. In particular, if rim 20 is provided with openings such as openings 34, exterior facing 22 will be provided with corresponding openings 36 which would overlap openings 34. Exterior facing 22 is preferably a stamped sheet metal member having a chrome plated front face 38 and a rear face 40 having a shape generally corresponding to the configuration of a face 24, 26 of wheel rim 20. The method of applying exterior facing 22 to wheel rim 20 will be described hereinafter. In one embodiment, the facing comprises only a ring or sectional portion for covering only a portion of the rim such as the circumference of the rim or the hub portion.

With reference to FIGS. 5–11, a wheel rim assembly for a passenger vehicle will be described. A passenger vehicle wheel 50 is shown including a tire 52 and rim 54. An exterior facing 56 is applied to rim 54 according to the principles of the present invention. Rim 54 is assembled to a wheel hub 58 provided with a plurality of threaded lugs 60. A central hub portion 62 of rim 54 is provided with an opening 64 for receiving wheel mount hub 58. Central hub portion 62 is provided with a plurality of lug holes 66 for receiving threaded lugs 60. A spoke portion 68 extends radially from central hub portion 62. Openings 70 generally are provided in spoke portion 68 for aesthetic and cooling purposes. In particular, openings 70 allow cooling air to pass through rim 54 in order to cool the brake assembly disposed behind rim 54. An example of one shape for the openings 70 is depicted in FIG. 5, but is not intended as limiting. A wheel well portion 72 is attached to the radially outer portion 74 of spoke portion 68. Radially outer portion 74 of spoke portion 68 is provided with an axially-extending flange 76. It should be noted that the above description of rim 54 is intended to generally describe a standard passenger vehicle rim, such as cast aluminum, stamped full face wheel (aluminum or steel) and spider and rim type designs.

Figure 7:
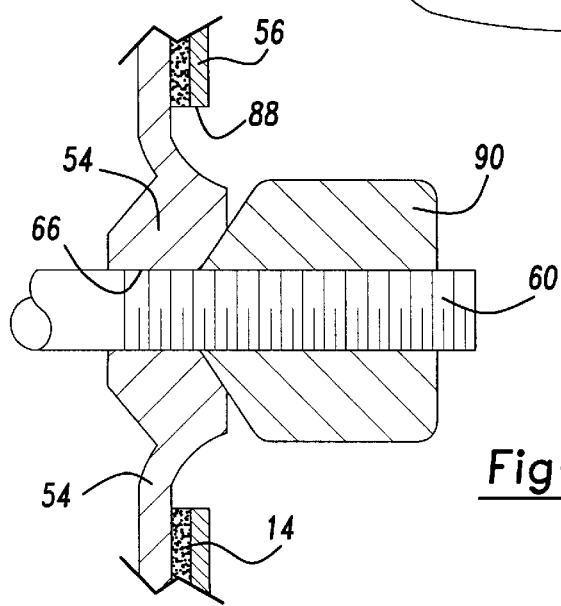
FIG. 7 is a cross-sectional view taken along line 7—7 of FIG. 5.
Figure 9:
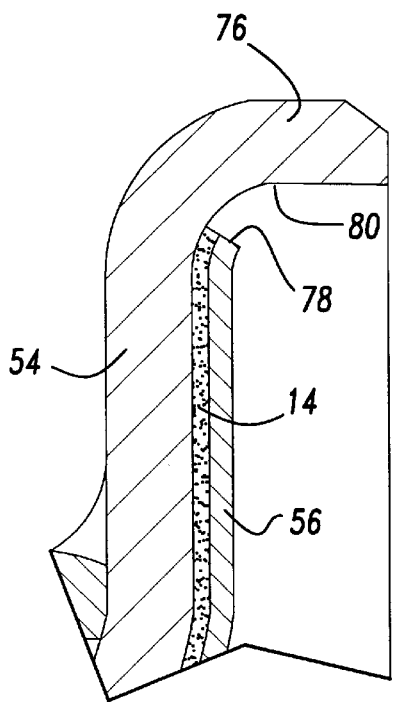
FIG. 9 is a cross-sectional view taken along line 9-9 of FIG. 8.

Exterior facing 56 is applied to rim 54 using the bonding material 14. With reference to FIG. 9, exterior facing 56 is provided with a radially outermost edge 78 which extends to a base portion 80 of flange 76. Exterior facing 56 has a configuration generally conforming with a shape of the face 82 of rim 54. Openings 84 are provided in exterior facing 56 corresponding to openings 70 in rim 54. A central opening 86 is provided for receiving wheel mount hub 58. Openings 88 are provided for corresponding with openings 66 in rim 54. Openings 88 are designed to be larger in diameter than lug nuts 90 which secure rim 54 to wheel mount 58. Thus, lug nuts 90 do not contact exterior facing 56, as shown in FIG. 7. Preferably, the attachment of the exterior facing 56 to the rim 54 is due to the bonding material 14, and does not require a mechanical lock of the facing 56 onto the rim 54.

As a second embodiment of the present invention, exterior facing 56 is provided with a radially outermost portion 92 which wraps around a radially outer edge 76a of flange 76 as shown in FIG. 10. Thus, the exterior facing 56 completely covers the face of rim 54 including flange portion 76. The bonding material 14 is provided between flange 76 and the radially outermost portion of exterior facing 56 as shown in FIG. 10. In one highly preferred embodiment, the wrap around does not require a mechanical lock of the facing 56 onto the rim 54, and the attachment of the exterior facing 56 to the rim 54 is due to the bonding material 14.

With reference to FIG. 11, a third embodiment is shown wherein exterior facing 56 has a radially outer edge which extends around a radially inner surface 76b of flange 76 and over a radially inner edge 76c of flange 76. Like the second embodiment (of FIG. 10), preferably, the attachment of the exterior facing 56 to the rim 54 is due to the bonding material 14, without requiring a mechanical lock of the facing 56 onto the rim 54. As with the motorcycle wheel embodiment, the exterior facing 56 may comprise a ring or sectional portion for covering only a portion of the rim.

Figure 12:
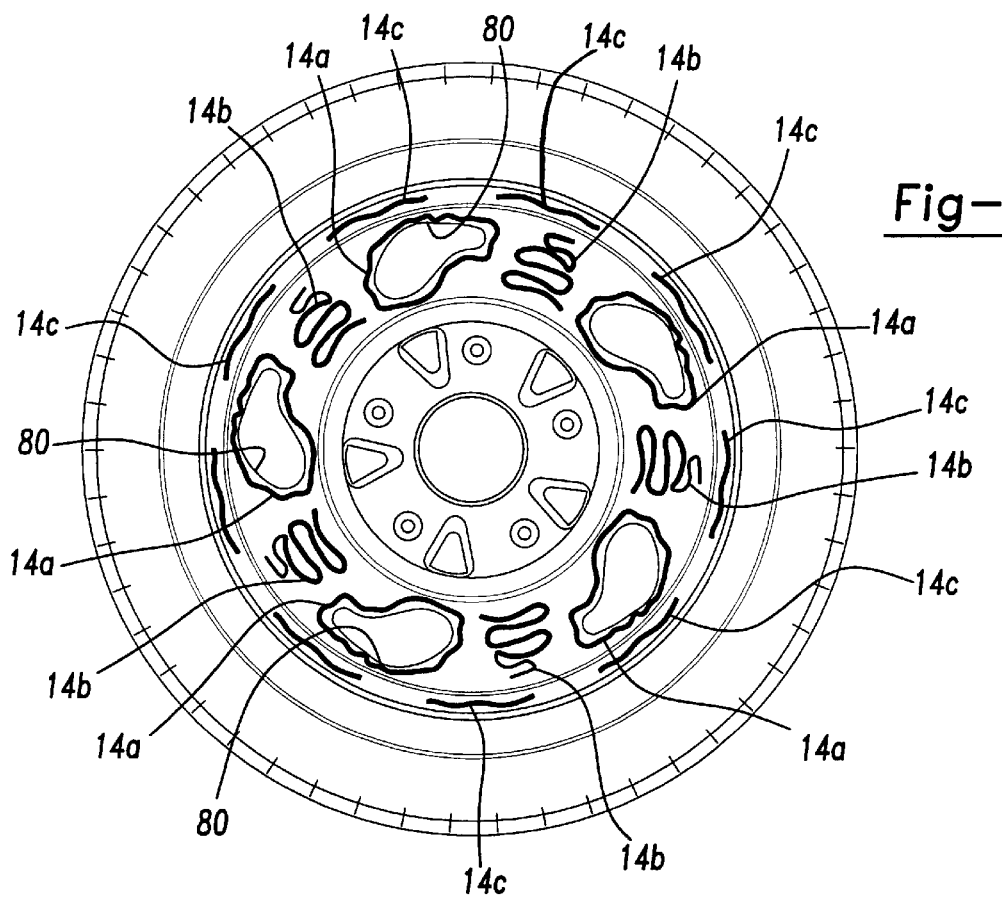
FIG. 12 is a side view of a vehicle rim illustrating the pattern for applying the bonding material according to the principles of the present invention.

In both the motorcycle rim and passenger vehicle rim embodiments of the present invention, the exterior facing 56 is preferably provided with a nickel-chrome plated outer face, as discussed above. Furthermore, the bonding material 14 can be applied to either the exterior facing or the rim surface. As shown in FIG. 12, the bonding material 14 is preferably provided in a bead around a periphery of any openings 14a, between the openings 14b and intermittently around a radially outer surface of the rim or exterior facing 14c. The bonding material 14 is preferably applied approximately in a 6–7 mm bead while the wheel is removed from the vehicle and disposed with the decorative surface of the exterior facing generally facing 56 upward. A suitable dispensing device, such as a caulk gun, is employed to dispense the bonding material.

If the exterior facing 56 is applied to an aluminum rim (or between dissimilar metals, in general), the bonding material 14 can be used as a coating between the exterior facing 56 and rim 54 in order to help prevent galvanic corrosion which may occur between dissimilar metals. In this case, preferably, the entire rear surface of the exterior facing or the face of the aluminum rim are completely coated with bonding material 14.

In one embodiment, a kit is provided for use by an applicator of the exterior facing to a rim. The kit preferably contains the bonding material and the exterior facing, but also may include one or more of a rim, lug nuts, a cleaner for preparing the surface of the rim, an applicator for the rim surface cleaner, and cleaner for the decorative surface of the exterior facing. Other components may be provided in the kit such as a wheel lock, emblems, or the like. The kit may be assembled in any suitable package.

The present invention also includes a method for applying the exterior facing to a rim of a vehicle wheel, including the steps of providing an exterior facing in a shape generally conforming with a shape of a face of said rim; applying a bonding material to one of said exterior facing and said face of said rim; and applying said exterior facing to said rim, wherein said bonding material is a silicone based material as described previously.

The step of providing an exterior facing in a shape generally conforming with a shape of a face of said rim includes the step of providing a piece of flat sheet metal. The sheet metal is then formed using conventional stamping tools and techniques in the shape of the wheel rim face, and the openings are punched in a press.

The step of applying the bonding material to one of said exterior facing and said face of said rim also includes the steps of preparing the wheel rim by cleaning the rim to remove unwanted residue that may affect bonding, such as road grime (in the case of a used rim), from the face of the rim. The cleaning process can include the use of a suitable cleaner (including but not limited to citrus-based cleaners or suitable alcohol-based cleaners, such as isopropyl alcohol) for breaking down the grime and also the surface of the rim can be scoured with a suitable abrasive (e.g. a flexible foam-backed scuff pad having a very fine grit on the surface of the foam, such as is commercially available from Minnesota Mining and Manufacturing Company under the designation of "Automotive Scuff Pad") in order to prepare the surface of the rim to receive the bonding material. The bonding material is applied to the rim face in the manner described with reference to FIG. 12. The bonding material is applied in ambient conditions. Preferably, the bonding material provides a resulting seal in order to keep dirt, water, and other materials from getting between the rim and the exterior facing.

The step of applying said exterior facing to said rim, includes the step of supporting the rim in a generally horizontal position with the face of the rim facing vertically upward. Other positions may be suitably employed. The exterior facing 56 is then placed onto the face of the rim 54 and pressed lightly (such as by the applicator's hands) such that the bonding material 14 is flattened out to a thickness of approximately 0.5–6 mm (preferably about 1 mm) and is generally dispersed completely between the exterior facing 56 and the rim 54, although complete dispersion is not required. There is no need for a mechanical locking device to hold the exterior facing in place, and there is no need to maintain the pressure during the curing of the silicone bonding material.

EXAMPLE

An exterior facing is applied to the face of the rim in the manner described above using LOCTITE product 5900. The assembly of the present invention is tested by bending back an edge portion of the exterior facing and clamping a clamping device on the edge. The clamping device is then pulled away from the rim. The results show that an initial pull reaches about 525 lbs. at which time the metal skin tears at approximately a constant 300 lbs. In addition, a second test is conducted by spinning the rim at a speed of about 80 mph for about 5 minutes. The rim is then braked to a static position. The results of this example show that there is no seepage of the bonding material from between the rim and exterior facing. There is also no separation of the exterior facing from the rim, and no clocking (i.e. rotational translation) of the exterior facing relative to the rim during acceleration or deceleration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for applying an exterior facing to a rim of a vehicle wheel, comprising the steps of: providing a metal exterior facing in a shape generally conforming with a portion of a face of said rim, said rim having an axially extending outer flange around a periphery of said face and said exterior facing having a radially outer edge adapted to wrap around said outer flange of the rim, said exterior facing having a decorative coating provided on a surface thereof;

applying a single bonding material to one of said exterior facing and said face of said rim; and applying said exterior facing to said rim, said bonding material extending between said axially extending outer flange and said exterior facing which wraps around said outer flange of the rim, wherein said single bonding material is a silicone based material;

wherein said rim and said exterior facing are free from any mechanical locking means and other fixturing means other than said single bonding material for holding said exterior facing against said rim.

2. The method according to claim 1, wherein said step of applying a bonding material to one of said exterior facing and said face of said rim includes the step of applying said bonding material to said face of said rim, said face of said rim having a plurality of openings therethrough, said bonding material being applied around a periphery of said openings, between said openings and intermittently around a radially outer surface of said face of said rim.

3. The method according to claim 1, wherein said step of applying a bonding material to one of said exterior facing and said face of said rim includes the step of applying said bonding material to said exterior facing, said exterior facing having a plurality of openings therethrough corresponding with openings in said face of said rim, said bonding material being applied around a periphery of said openings, between said openings and intermittently around a radially outer surface of said exterior facing.

4. The method according to claim 1, wherein said bonding material is based on an oxime silicone rubber-containing material.

5. The method according to claim 4, wherein said rim has a plurality of lug holes for receiving a plurality of lugs extending from a hub and said exterior facing has a plurality of openings corresponding with said lug holes, said openings being large enough such that lug nuts applied to said lugs will not contact said exterior facing.

6. The method according to claim 1, further including the step of allowing said bonding material to cure for at least five minutes.

7. The method according to claim 1, wherein said step of applying said exterior facing to said rim includes the step of supporting said rim generally horizontally with said face of said rim facing vertically upward.

8. The method according to claim 1, wherein said rim has a plurality of lug holes for receiving a plurality of lugs extending from a hub and said exterior facing has a plurality of openings corresponding with said lug holes, said openings being large enough such that lug nuts applied to said lugs will not contact said exterior facing.

* * * * *